United States Patent
Baldwin et al.

(10) Patent No.: US 10,146,784 B2
(45) Date of Patent: Dec. 4, 2018

(54) DEFRAGMENTING FILES HAVING FILE BLOCKS IN MULTIPLE POINT-IN-TIME COPIES

(71) Applicant: INTERNATIONAL BUSINESS MACHINES CORPORATION, Armonk, NY (US)

(72) Inventors: Duane M. Baldwin, Mantorville, MN (US); John T. Olson, Tucson, AZ (US); Sandeep R. Patil, Pune (IN); Riyazahamad M. Shiraguppi, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 355 days.

(21) Appl. No.: 14/146,649

(22) Filed: Jan. 2, 2014

(65) Prior Publication Data
US 2015/0186402 A1    Jul. 2, 2015

(51) Int. Cl.
*G06F 17/30* (2006.01)

(52) U.S. Cl.
CPC .............. *G06F 17/30135* (2013.01)

(58) Field of Classification Search
CPC ........... G06F 17/30135; G06F 11/1435; G06F 12/0862; G06F 3/0608; G06F 11/1466; G06F 11/1469; G06F 17/30091
See application file for complete search history.

(56) References Cited

U.S. PATENT DOCUMENTS

| | | | |
|---|---|---|---|
| 6,735,678 B2 | 5/2004 | Noble et al. | |
| 7,124,272 B1 | 10/2006 | Kennedy et al. | |
| 7,447,836 B2 | 11/2008 | Zhang et al. | |
| 7,702,870 B2 | 4/2010 | English et al. | |
| 7,873,806 B2 | 1/2011 | Prahlad et al. | |
| 8,386,434 B2 | 2/2013 | Kusters et al. | |
| 8,682,870 B1 * | 3/2014 | Gardner | G06F 11/1469 707/692 |
| 8,909,887 B1 * | 12/2014 | Armangau | G06F 3/0643 707/693 |
| 9,330,009 B1 * | 5/2016 | Throop | G06F 12/0866 |
| 2005/0102475 A1 * | 5/2005 | Reohr | G06F 12/0862 711/128 |

(Continued)

OTHER PUBLICATIONS

Disk Defragmenter (Windows), Wikipedia, [online] [retreived Sep. 29, 2013], http://en.wikipedia.org/w/index.php?title=Disk_Defragmenter_(Window . . . .

(Continued)

*Primary Examiner* — Etienne P Leroux
(74) *Attorney, Agent, or Firm* — David W. Victor; Konrad Raynes Davda & Victor LLP

(57) ABSTRACT

Provided are a computer program product, system, and method for defragmenting files having file blocks in multiple point-in-time copies. Multiple point-in-time copies for a file having file blocks ap. Maintained. Each point-in-time copy to the file has at least one different block in the storage for at least one of the file blocks in the file. For each of a plurality of the point-in-time copies for the file, moving the blocks for the file blocks in the point-in-time copy to contiguous locations on the storage.

22 Claims, 8 Drawing Sheets

(56) References Cited

U.S. PATENT DOCUMENTS

| | | | |
|---|---|---|---|
| 2007/0113036 A1* | 5/2007 | Gal-Oz | G06F 3/0608 711/165 |
| 2007/0226436 A1* | 9/2007 | Cheng | G06F 11/1435 711/162 |
| 2008/0077762 A1 | 3/2008 | Scott et al. | |
| 2008/0263059 A1* | 10/2008 | Coca | G06F 3/0613 |
| 2008/0313245 A1* | 12/2008 | Langley | G06F 11/1466 |
| 2009/0055450 A1 | 2/2009 | Biller | |
| 2010/0180093 A1 | 7/2010 | Huber et al. | |
| 2013/0091185 A1* | 4/2013 | Dar | G06F 17/30091 707/812 |
| 2013/0185508 A1 | 7/2013 | Talagala et al. | |
| 2014/0025637 A1* | 1/2014 | Yueh | G06F 11/1435 707/649 |
| 2014/0156610 A1 | 6/2014 | Akers et al. | |
| 2015/0186401 A1 | 7/2015 | Baldwin et al. | |

OTHER PUBLICATIONS

"Defragmentation", Wikipedia, [online] [retreived Oct. 5, 20135], http://en.wikipedia.org/w/index.php?title=Defragmentation&printable=yes.

U.S. Appl. No. Unknown, filed Jan. 2, 2014.

Office Action dated Feb. 4, 2016, pp. 31, for U.S. Appl. No. 14/146,645, filed Jan. 2, 2014.

Response dated May 4, 2016, pp. 14, to Office Action dated Feb. 4, 2016, pp. 31, for U.S. Appl. No. 14/146,645, filed Jan. 2, 2014.

Final Office Action dated Jul. 8, 2016, pp. 32, for U.S. Appl. No. 14/146,645, filed Jan. 2, 2014.

RCE Response dated Oct. 10, 2016, pp. 14, to Final Office Action dated Jul. 8, 2016, pp. 32, for U.S. Appl. No. 14/146,645, filed Jan. 2, 2014.

Interview Agenda dated Sep. 9, 2016, pp. 3, for U.S. Appl. No. 14/146,645, filed Jan. 2, 2014.

Interview Agenda dated Sep. 9, 2016, pp. 2 U.S. Appl. No. 14/146,645, filed Jan. 2, 2014.

Office Action dated Nov. 18, 2016, pp. 51, for U.S. Appl. No. 14/146,645, filed Jan. 2, 2014.

Response dated Feb. 21, 2017, pp. 18, to Office Action dated Nov. 18, 2016, pp. 51, for U.S. Appl. No. 14/146,645, filed Jan. 2, 2014.

Response dated Jan. 5, 2018, pp. 20, to Office Action dated Oct. 4, 2017, pp. 46, for U.S. Appl. No. 14/146,645, filed Jan. 2, 2014.

Office Action dated Oct. 4, 2017, pp. 46, for U.S. Appl. No. 14/146,645, filed Jan. 2, 2014.

Response dated Jul. 13, 2017, pp. 19, to Final Office Action dated Apr. 7, 2017, pp. 48, for U.S. Appl. No. 14/146,645, filed Jan. 2, 2014.

Final Office Action dated Apr. 7, 2017, pp. 48, for U.S. Appl. No. 14/146,645, filed Jan. 2, 2014.

Final Office Action3 dated Apr. 24, 2018, pp. 32, for U.S. Appl. No. 14/146,645, filed Jan. 2, 2014.

Response dated Jun. 28, 2018, pp. 20, to Final Office Action3 dated Apr. 24, 2018, pp. 32, for U.S. Appl. No. 14/146,645, filed Jan. 2, 2014.

Notice of Allowance dated Jul. 25, 2018, pp. 11, for U.S. Appl. No. 14/146,645.

* cited by examiner

Point-in-Time Copy Information

Point-in-Time Access Information

Block Information

DEFRAGMENTING FILES HAVING FILE BLOCKS IN MULTIPLE POINT-IN-TIME COPIES

BACKGROUND OF THE INVENTION

1. Field of the Invention

The present invention relates to a computer program product, system, and method for defragmenting files having file blocks in multiple point-in-time copies.

2. Description of the Related Art

A file system provides a framework for naming and indexing files and arranging them on storage devices, such as an electro-magnetic disk drive, for storage and retrieval. File system functionality can be divided into two components, a user component and a storage component. The user component is responsible for managing files within directories, file path traversals and user access to the file. The storage component of the file system determines where files are physically stored on the storage devices.

In a disk storage system, as the stored files and other objects grow in size, additional storage space is required. Additional space for a file that has increased in size may be allocated at non-contiguous locations to where other blocks of the file are stored. Further, when files or blocks of files are deleted, the freed space may result in blocks for a file being in discontiguous locations. This leads to disk fragmentation or the discontiguous storage of blocks of a single logical object. A file layout that is discontiguous may adversely affect system performance because contiguous logical blocks that are likely to be accessed sequentially may not be stored at contiguous physical locations on the disk, thereby requiring the disk drive read head to seek and rotate the disk head to move to a discontiguous location to read further blocks for a file.

Disk defragmentation describes the process of consolidating fragmented files on the disk surface. A disk defragmenter is a software tool that rearranges and moves blocks of data on the hard disk surface so contiguous logical blocks are at contiguous physical locations on the disk surface to avoid latencies resulting from the drive read head having to seek to a discontiguous location for contiguous logical blocks. Disk management and defragmentation utilities may be bundled with operating system components or available as separate applications.

SUMMARY

Provided are a computer program product, system, and method for defragmenting files having file blocks in multiple point-in-time copies. Multiple point-in-time copies for a file having file blocks ap. Maintained. Each point-in-time copy to the file has at least one different block in the storage for at least one of the file blocks in the file. For each of a plurality of the point-in-time copies for the file, moving the blocks for the file blocks in the point-in-time copy to contiguous locations on the storage.

DETAILED DESCRIPTION

Disk defragmentation is costly in terms of the system resources used to move data from non-contiguous to contiguous locations on the disk surface. The data movement operations for the defragmentation process not only place additional stress on the system, but also degrade application performance while the defragmentation is in progress. Even if defragmentation is performed during low Input/Output (I/O) activity, the defragmentation process may block application access to requested blocks that are in the process of being moved. Further in large file-systems containing thousands of files and terabytes of data, the defragmentation process can continue for many hours, even days, and negatively impact system performance during this time.

Further, disk defragmentation is complicated in systems having multiple point-ion-time copies of files, because each point-in-time ("PiT") copy may have different versions of blocks for the file, so for defragmentation of files, consideration has to be made of how to arrange file blocks from a same file, including blocks from different point-in-time copies.

Described embodiments provide techniques to defragment files in multiple PiT copies by ordering the PiT copies according to access frequencies, and then for each file, processing each of the PiT copies to move to contiguous locations blocks for the file blocks of the file that were not previously moved while processing previous PiT copies for the file. Further, when moving a block for a file block in a PiT copy, the defragmenter would select the most recently modified block that was modified as of the point-in-time of the PiT copy being processed. In this way, the blocks for file blocks in more frequently accessed PiT copies are moved first before moving the blocks for the file blocks in less frequently accessed PiT copies.

Figure 1:
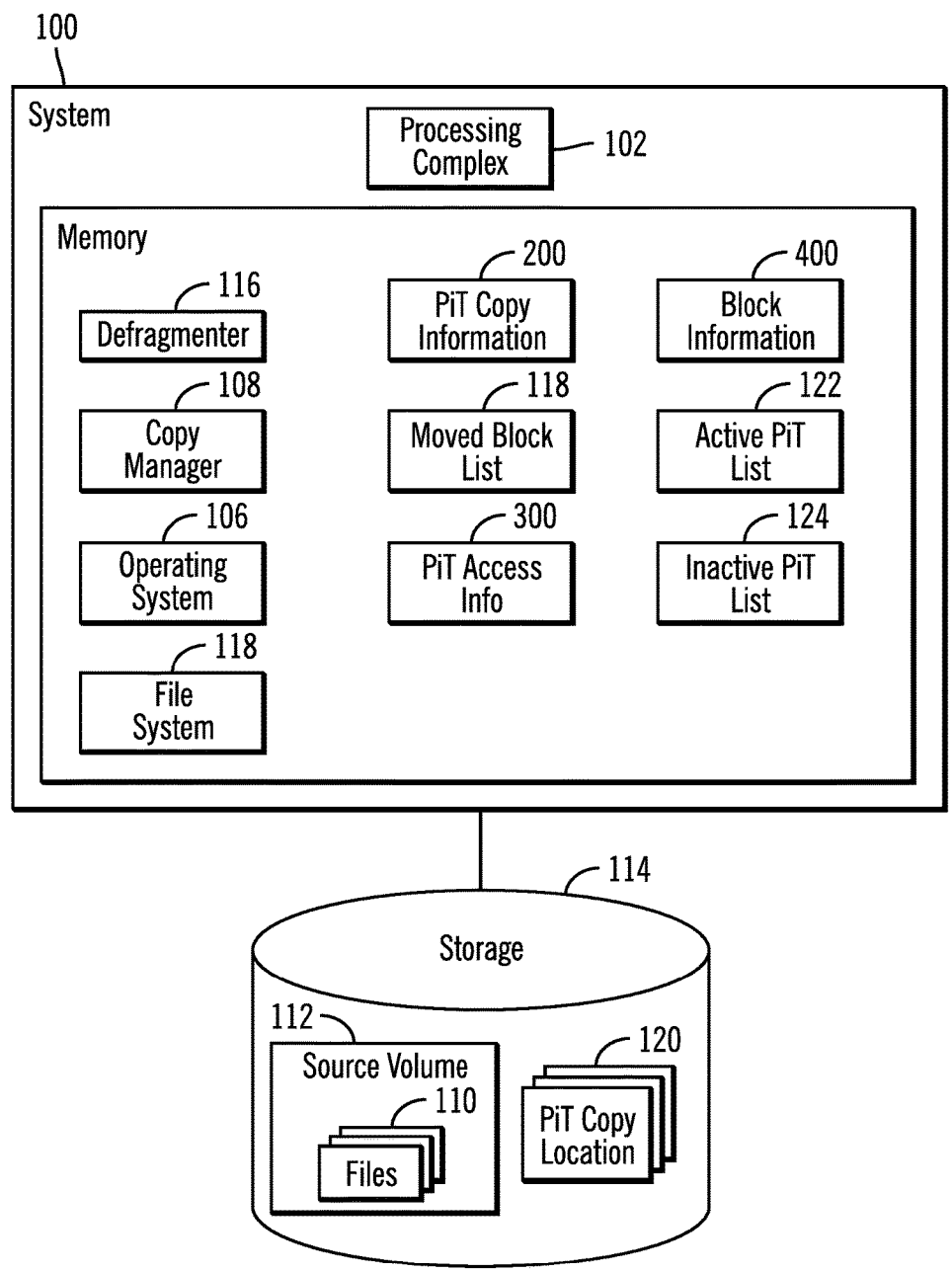
FIG. 1 illustrates an embodiment of a computing environment.

FIG. 1 illustrates an embodiment of a defragmentation computing environment. A system 100, such as a computer, server, etc., includes a processing complex 102 comprising one or more processors, each including one or more processing cores, and a memory 104 storing various program modules and data structures executed by the processor 102, including an operating system 106; a copy manager 108 to create point-in-time ("PiT") copies of files 110 in a source volume 112 stored in a storage 114; and a defragmenter 116 to defragment files 110 created by the operating system 106 and stored in volumes 112. The defragmenter 108 may be a component or module within the operating system 106 or an application external to the operating system 106, such as shown in FIG. 1.

The operating system 106 implements a file system 118 that provides access to the files 110 and metadata and information on the files formed in the file system 114. The copy manager 108 creates PiT copy information 200 having information on the PiT copies of the files 110 in one or more source volumes 112. The PiT copy information 200 indicates the source volume 112 or files 110 subject to the PiT copy and a PiT copy location 120 having blocks for the files 110 as of the point in time of the PiT copy that were subsequently modified in the source volume 112. The defragmenter 116 maintains PiT access information 300 having information on a number of accesses to the PiT copies of the volume 112 that is used to determine an order in which the PiT copies are processed to defragment their file blocks. To perform the defragmentation, the defragmenter 116 may form two lists of PiT copies, each ordered according to the number of accesses to the PiT copies in descending order, including an active PiT list 122 providing the ordered list of active PiT copies and an inactive PiT list 124 providing the ordered list of inactive PiT copies.

Figure 2:
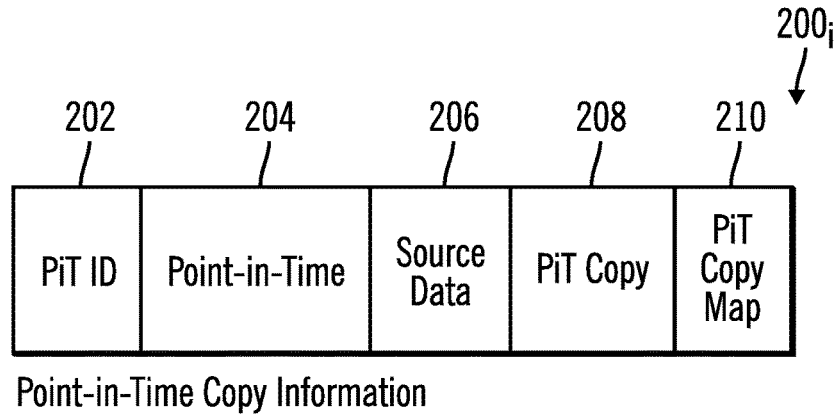
FIG. 2 illustrates an embodiment of point-in-time copy information for a point-in-time copy.

FIG. 2 illustrates an embodiment of PiT copy information for a specific PiT copy instance $200_i$ included in the PiT copy information 200, including a PiT copy identifier (ID) 202; a point-in-time 204 indicating a timestamp of when the PiT copy $200_i$ was created; source data 206 subject to the PiT copy, such as a source volume 112 or files within the source volume 112; a location of a PIT copy 206 including data as of the point-in-time 204 that was changed or modified in the source data 206, shown as PiT copy locations 120 in the storage 114; and a PiT copy map 210 indicating whether blocks in the source data 204 have been copied to the PiT copy 208, thus indicating whether the blocks for the PiT copy 200i are located in the source volume 112 or at the PiT copy location 208.

In one embodiment, the PiT copies $200_i$ may comprise snapshot copies or FlashCopy® copies. (FlashCopy is a registered trademark of International Business Machines Corporation in the United States and other countries).

Figure 3:
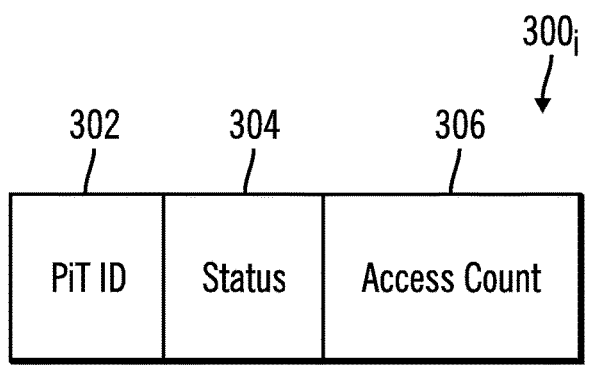
FIG. 3 illustrates an embodiment of point-in-time copy access information.

FIG. 3 illustrates an embodiment of an instance $300_i$ of PiT access information for one PiT copy included in the PiT access information 300, including a PiT ID 302, a status 304 of the identified PiT copy 302, such as active or inactive, and an access count 306 indicating a number of read and/or write accesses that have occurred since the accesses have been collected.

Figure 5:
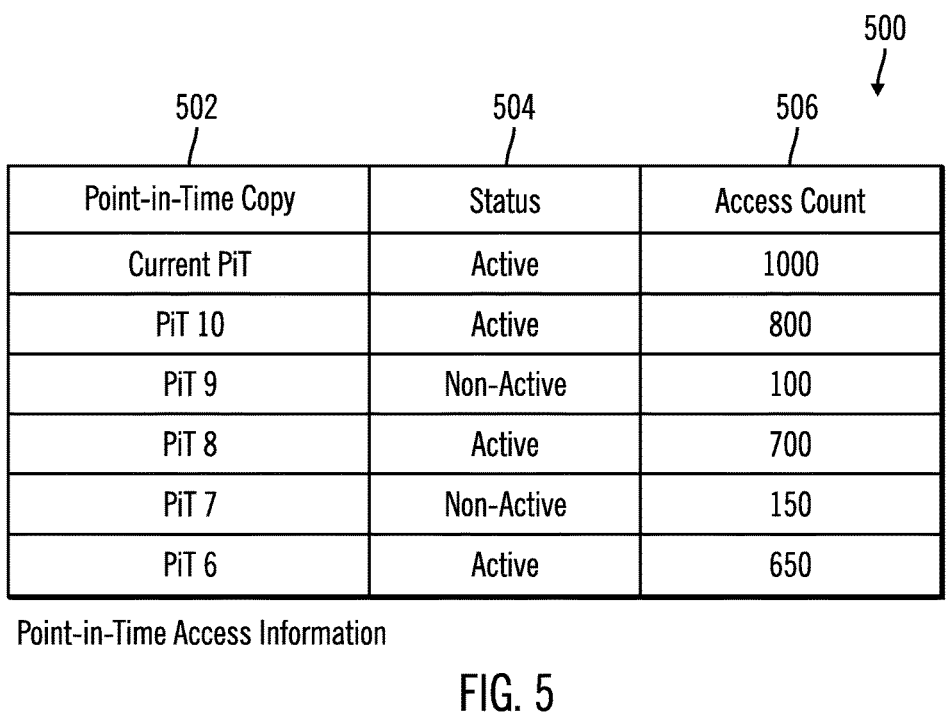
FIG. 5 illustrates an example of the point-in-time access information of FIG. 3.

FIG. 5 illustrates an example 500 of the PiT access information 300, including a PiT copy identifier 502, status 504, and access count 504 corresponding to the fields 302, 304, and 306, respectively, in the PiT access information $300_i$ of FIG. 3.

Figure 4:
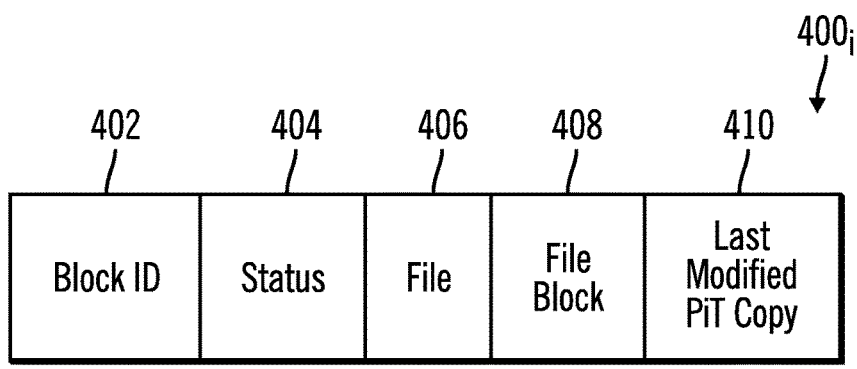
FIG. 4 illustrates an embodiment of block information for a block allocated to a file block in a file.

FIG. 4 illustrates an embodiment of an instance $400_i$ of block information in the block information 400 for one block allocated to one of the file blocks in one of the files 110. The block information $400_i$ instance includes a block identifier (ID) 402; a status 404 indicating the block as allocated or free; the file 406 and file block 408 to which the block is allocated; and a last modified PiT copy 410 in which the block 402 was modified. Thus, for one file block there may be multiple block information $400_i$ instances for blocks having different versions of the file block in different PiT copies.

Figure 6:
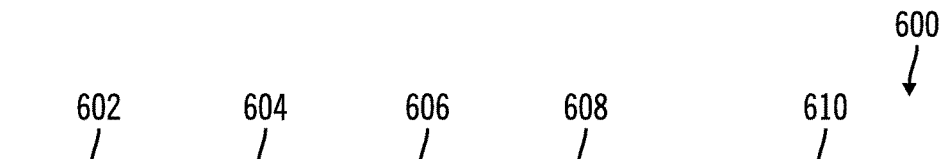
FIG. 6 illustrates an example of the block information for the block information of FIG. 4.

FIG. 6 illustrates an example 600 of the block information 400, including a block ID 602, status 604, file 606, file block 608, and a last modified PiT copy 610 corresponding to the fields 502, 504, 506, 508, and 510 in the block information $400_i$ of FIG. 4.

Figure 7A:
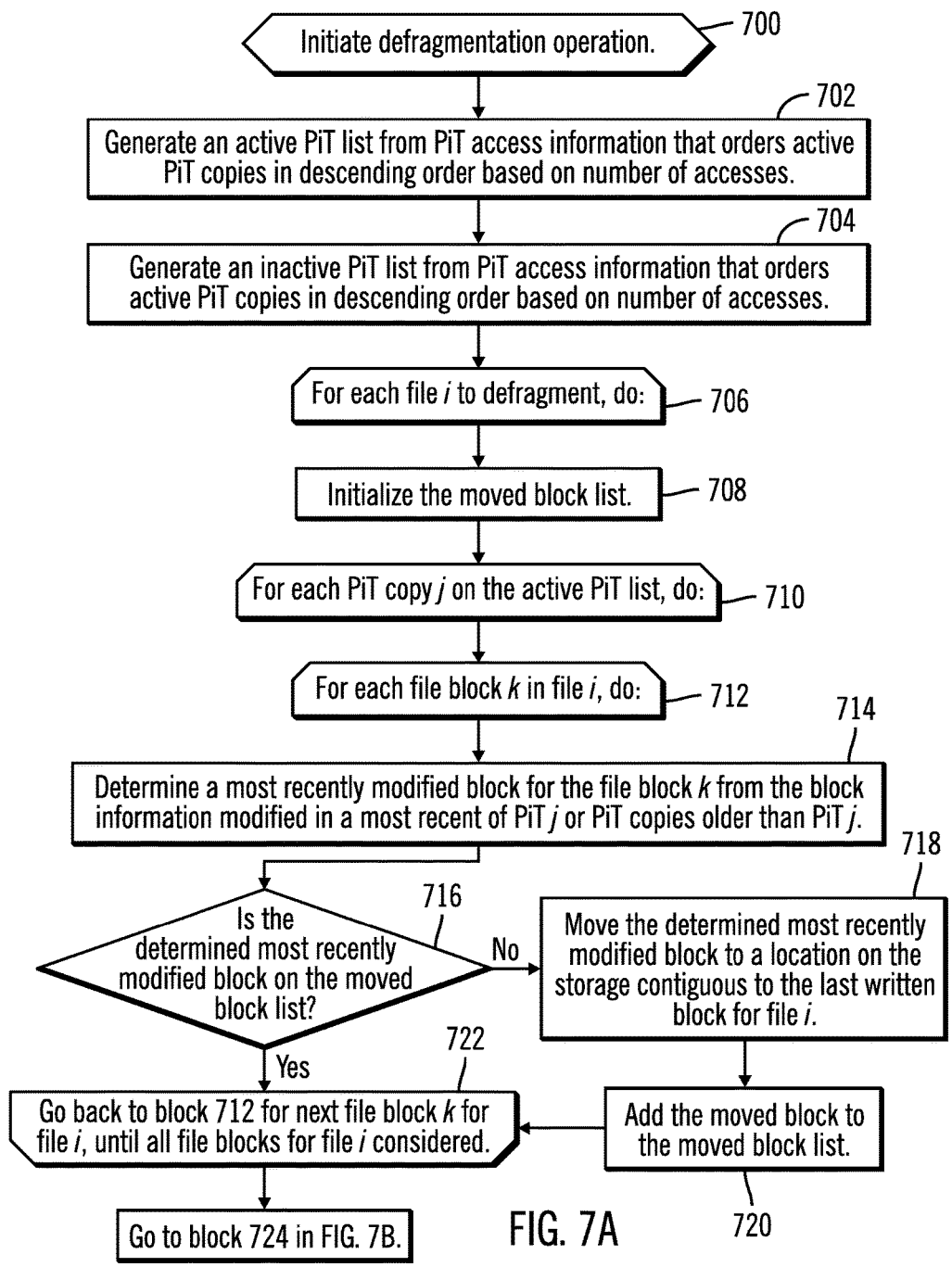
FIGS. 7a and 7b illustrate an embodiment of operations to defragment files in multiple point-in-time copies.
Figure 7B:
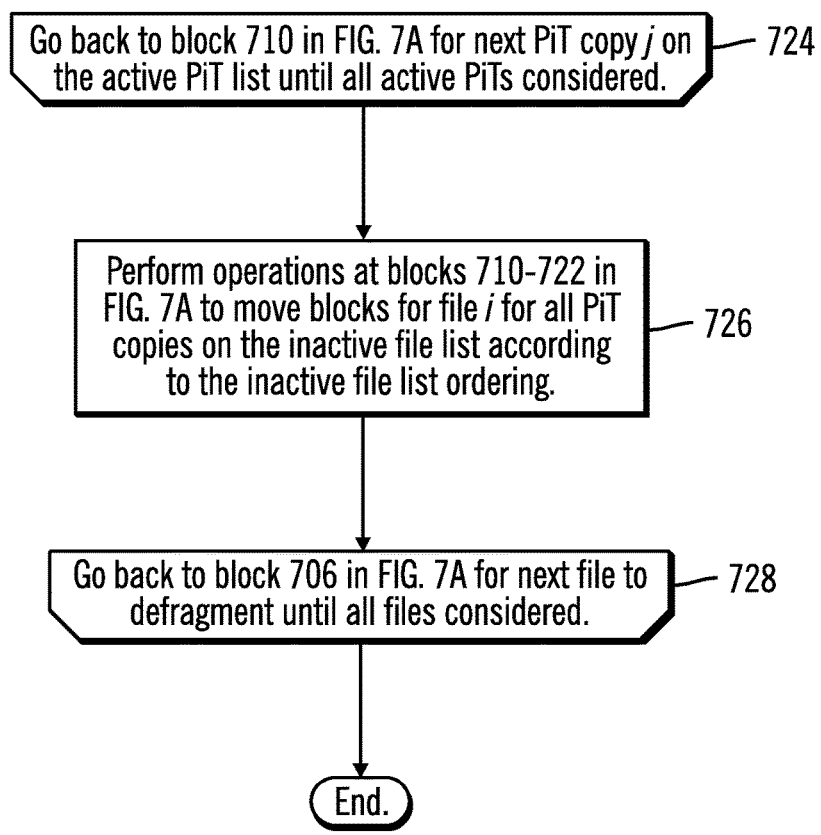

FIGS. 7a and 7b illustrates an embodiment of operations performed by the defragmenter 116 to defragment blocks for file blocks in files 110 that are maintained in different point-in-time copies $200_i$. Upon initiating (at block 700) a defragmentation, the defragmenter 116 generates (at block 702) an active PiT list 122 from PiT access information 300 that lists active PiT copies ordered in descending order based on the number of accesses 306. An inactive PiT list 124 is generated (at block 704) from PiT access information that orders inactive PiT copies in descending order based on the number of accesses 306.

The defragmenter 116 then performs a loop of operations at block 706 through 728 for each file i to defragment in the source volume 112. For each file i, the defragmenter 116 first initializes (at block 708) the moved block list 118 to have no entries and then performs a loop of operations at blocks 710 through 724 for each PiT copy j having blocks for file i. Then for each PiT copy j, a loop of operations is performed at blocks 712 through 722 through 722 for each file block k in file i. At block 714, the defragmenter 116 determines (at block 714) a most recently modified block for the file block k from the block information 400 which is in the most recent of PiT j or a PiT copy older than PiT j. For instance, the defragmenter 116 may determine from the block information 400 the instances $400_i$ of blocks having file block k in field 408, the block 402 having a last modified PiT copy 410 that is in the current PiT copy j being considered or in an older PiT copy than the PiT copy being considered, which comprises the most recently modified block for file block k as of a point-in-time equal to or less than the point-in-time 204 (FIG. 2) of the PiT copy j.

If (at block 716) the determined most recently modified block for file block k is not on the moved block list 118, meaning it was not previously moved as part of defragmenting file i, then the defragmenter 116 moves (at block 718) the determined most recently modified block to a location in the storage 114 contiguous to the last written (or moved) block for file i. The moved block is then added (at block 720) to the moved block list 118, so that a block for one file block k in file i is only moved once across all the PiT copies being processed to defragment file i.

After moving (at block 720) the block or if (from the yes branch of block 716) the determined block was already moved, then control proceeds (at block 722) back to block 712 to process the next file block for file i. After processing all the file blocks for file i for the PiT copy j, then control proceeds (at block 724 in FIG. 7b) back to block 710 in FIG. 7a to process the next PiT copy on the active PiT list 122 to determine blocks to move for an next PiT copy having data for file i. After processing all the active PiT copies on the active PiT copy list 122 to move blocks in the active PiT copies to contiguous locations on the storage 114, control proceeds to block 726 to perform the operations at blocks 710-722 in FIG. 7a to move blocks for file blocks for file i for all PiT copies on the inactive file list 124 according to the ordering of the inactive file list 124 to move the blocks for the file i that are in inactive PiT copies to contiguous locations on the storage 114 with respect to the previously moved/defragment blocks for file i. After processing all the inactive PiT copies for file i, then control proceeds (at block 728) to block 708 in FIG. 7a to process the next file 110 to defragment until all files have been processed.

With the described embodiments, blocks for a file are defragmented by processing all the PiT copies having blocks for the file in order to move the blocks to contiguous locations. In described embodiments, the PiT copies are processed to determine blocks to move according to an ordering based on the number of accesses to the PiT copies and whether the PiT copies are active or inactive. In alternative embodiments, different criteria may be used to determine the order in which the PiT copies are processed to determine blocks for a file to move.

Further, in described embodiments, first the blocks for a file are moved to contiguous locations for the active PiT copies, which may be ordered according to accesses to the PiT copies, and then for the inactive PiT copies.

In described embodiments, a block for a file block is moved only once. In an alternative embodiment, the same block in different PiT copies may be written multiple times so that the blocks for all the file blocks in each PiT copy are written contiguously.

Further, with described embodiments, by moving all the blocks for file blocks for PiTs serially, the different blocks (i.e., the different versions of the blocks) for one file block in different PiT copies would not be contiguous because the blocks are processed on a PiT basis, where all the blocks for file blocks in each PiT copy are contiguous. In an alternative embodiment, multiple blocks for one file block may be written contiguously across PiT copies.

Figure 8:
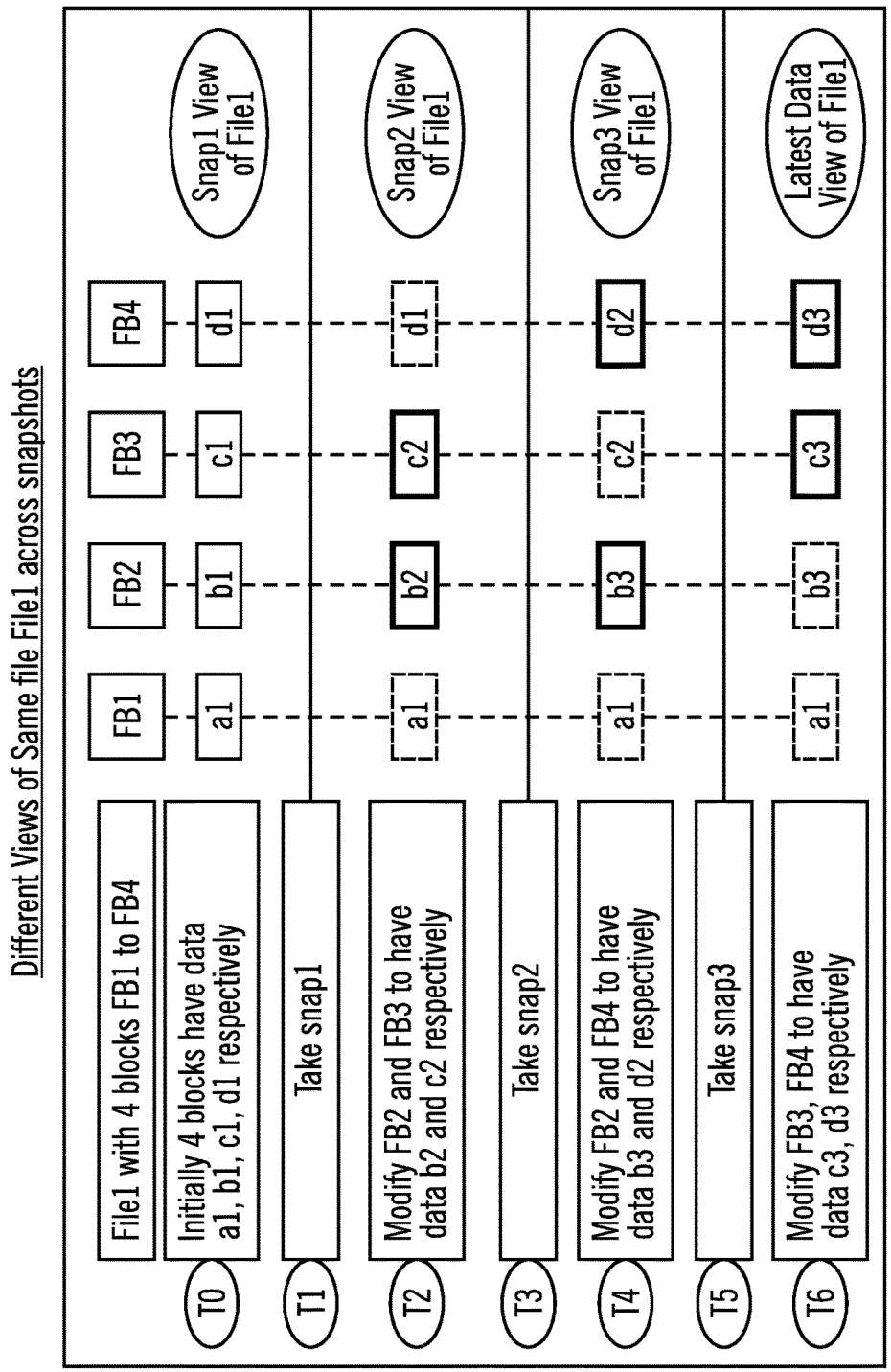
FIG. 8 illustrates an example of how blocks are modified in different point-in-time copies.

FIG. 8 provides an example of how the blocks $a_i$, $b_i$, $c_i$, $d_i$ for file blocks FB1, FB2, FB3, and FB4, respectively, change for different PiT copies, e.g., snap1, snap2, snap3, Latest Data View, for different times i for i equals 1 to 4. For instance, a first PiT copy, or snap1, taken at time T1 has four blocks $a_1$, $b_1$, $c_1$, and $d_1$ for file blocks FB1, FB2, FB3, and FB4, respectively. When the second PiT copy or snap2 is taken at time T3, the blocks for the second FB2 and third FB2 file blocks have changed to $b_2$ and $c_2$, respectively. When the third PiT copy or snap 3 is taken at time T5, the blocks for the second FB2 and fourth FB4 file blocks have changed to $b_3$ and $d_2$, respectively. When the current or latest PiT copy is taken at T6, the third FB3 and fourth FB4 file blocks have changed to $c_3$ and $d_3$, respectively.

Assuming that the latest snap or fourth PiT copy and snap2 are active, with the latest snap having higher priority, and that the first (snap1) and third (snap3) PiT copies are inactive with snap3 having higher priority (more accesses), then snap1, then according to the embodiment of FIGS. 7a and 7b, the defragmenter 116 would write the blocks for the current latest snap first to contiguous locations, a1, b3, c3, d3, then write the non-common (not previously written) blocks of snap2, $b_2$, $c_2$, $d_1$, contiguously, resulting in the contiguous writing of blocks a1, b3, c3, d3, $b_2$, $c_2$, $d_1$. Next the non-common blocks to the previously written blocks for snap3, which is $d_2$, would be written following $d_1$, and then the further non-common blocks to all previously written blocks for snap 1, which are $b_1$ and $c_1$, are contiguously written following $d_2$.

Described embodiments provide techniques to perform defragmentation of blocks for file blocks in files that are contained in multiple PiT copies which provide different versions of the same file blocks. In described embodiments, to optimize storage, a block for a file block in multiple PiT copies is only moved once when first processed in one of the PiT copies for the file. Further, when moving the blocks for a file block for a PiT copy being processed, the most recently modified block for the file block as of the point-in-time of the PiT copy being processed is moved. Further, to ensure that the most frequently used data is defragmented first, blocks are written contiguously first from active PiT copies having a greatest number of accesses. In this way, if defragmentation is interrupted or delayed during a period of high activity, then the blocks in the most frequently accessed PiT copies are defragmented first because the benefits of defragmentation are likely to be realized more often for the more frequently accessed PiT copies.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 9:
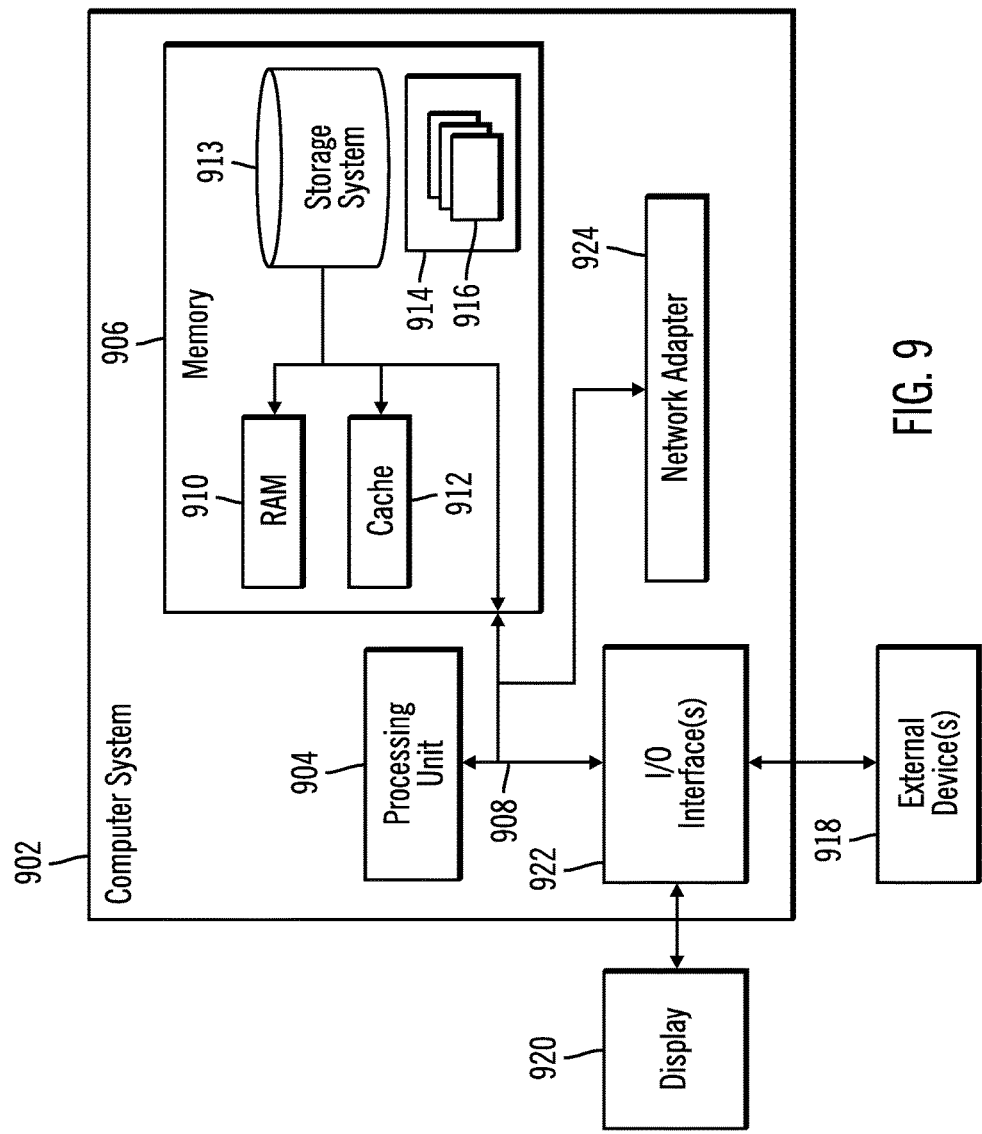
FIG. 9 illustrates a computing environment in which embodiments may be implemented.

The system 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular resources or implement particular abstract data types. Computer system/server 902 may be practiced in distributed cloud computing environments where resources are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 916 which generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 12; and/or any devices (e.g., network card, modem, etc.) that enable computer system/server 902 to communicate with one or more other computing devices. Such communication can occur via Input/output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for defragmenting files in a file system in a storage, the computer program product comprising a non-transitory computer readable storage medium having computer readable program code embodied therein that when executed performs operations, the operations comprising:

maintaining multiple point-in-time copies for a file having file blocks, wherein each point-in-time copy of the point-in-time copies to the file has at least one block in the storage that is a version for at least one of the file blocks in the file and wherein the each point-in-time copy of the point-in-time copies indicates a point-in-time copy location having versions of the file blocks for the file as of a point-in-time of the point-in-time copy that were subsequently modified;

determining accesses to the point-in-time copies;

determining an order of the point-in-time copies based on the determined accesses; and processing the point-in-time copies according to the determined order by performing, for each processed point-in-time copy, processed according to the determined order, for the file and for each file block of the file in the processed point-in-time copy, moving a most recently modified block of the file block being considered, in the processed point-in-time copy or in one of the point-in-time copies older than the processed point-in-time copy, to a location on the storage contiguous to a last written block for another file block in the file that was moved from one of the point-in-time copies, wherein the moving moves different versions of the blocks for the file blocks for the file from the multiple point-in-time copies to store blocks for the file blocks for the file from different of the point-in-time copies at contiguous locations on the storage.

2. The computer program product of claim 1, wherein the operations further comprise:

performing, for each of additional of the files, the moving of the blocks for the file blocks in the point-in-time copies for the file to contiguous locations, wherein for each of the blocks for the file blocks for the file moved from the point-in-time copies are moved to a contiguous location on the storage to a list written block for the file.

3. The computer program product of claim 1, wherein the moving the blocks for each of the point-in-time copies comprises only moving the blocks for the processed point-in-time copy that were not moved during previous instances of moving the blocks for the point-in-time copies for the file.

4. The computer program product of claim 1, wherein the operations further comprise:

maintaining a data structure indicating for each block a file block to which the block is allocated and a point-in-time copy in which the block was last modified; and determining the most recently modified block for the file block comprises determining from the data structure a block allocated to the file block whose indicated point-in-time copy in which the block was last modified is a most recent of the point-in-time copies at the point-in-time less than or equal to the point-in-time of the processed point-in-time copy.

5. The computer program product of claim 1, wherein the blocks for the file blocks are moved for the point-in-time copies having an active status before the blocks for the file blocks are moved for the point-in-time copies having an inactive status, wherein the inactive status is set for one of the point-in-time copies when the point-in-time copy is not accessed for a predetermined time.

6. The computer program product of claim 5, wherein the operations further comprise:

determining a first order of the point-in-time copies having the active status based on accesses to the point-in-time copies, wherein the point-in-time copies having the active status are processed to move the blocks for the file blocks according to the first order; and determining a second order of the point-in-time copies having the inactive status based on accesses to the point-in-time copies, wherein the point-in-time copies having the inactive status are processed to move the blocks for the file blocks according to the second order.

7. The computer program product of claim 1, wherein the determined order comprises ordering the point-in-time copies in descending order of the determined accesses.

8. The computer program product of claim 1, wherein the moving the blocks for each of the file blocks in the processed point-in-time copy comprises:
   determining whether the blocks for the processed point-in-time copy are in a list indicating blocks previously moved when previously processing the point-in-time copies, wherein blocks for the processed point-in-time copy or in one of the point-in-time copies older than the processed point-in-time copy are not moved if they are on the list; and
   indicating the blocks moved for the processed point-in-time copy on the list.

9. The computer program product of claim 1, wherein the file blocks for files in the point-in-time copies are defragmented serially, such that different versions of at least one of the blocks in different point-in-time copies are not at contiguous storage locations in the storage and blocks for the file blocks within each of the point-in-time copies are written contiguously.

10. The computer program product of claim 1, wherein the moving the blocks for the file blocks comprises moving multiple blocks for one of the file blocks from different point-in-time copies to contiguous locations on the storage.

11. A system for defragmenting files in a file system in a storage, comprising:
   a processor; and
   a computer readable storage medium having computer readable program code that when executed by the processor performs:
      maintaining multiple point-in-time copies for a file having file blocks, wherein each point-in-time copy of the point-in-time copies to the file has at least one block in the storage that is a version for at least one of the file blocks in the file and wherein the each point-in-time copy of the point-in-time copies indicates a point-in-time copy location having versions of the file blocks for the file as of a point-in-time of the point-in-time copy that were subsequently modified;
      determining accesses to the point-in-time copies;
      determining an order of the point-in-time copies based on the determined accesses; and
      processing the point-in-time copies according to the determined order by performing, for each processed point-in-time copy, processed according to the determined order, for the file and for each file block of the file in the processed point-in-time copy, moving a most recently modified block of the file block being considered, in the processed point-in-time copy or in one of the point-in-time copy older than the processed point-in-time copy, to a location on the storage contiguous to a last written block for another file block in the file that was moved from one of the point-in-time copies, wherein the moving moves different versions of the blocks of the file blocks for the file from the multiple point-in-time copies to store blocks for the file blocks for the file from different of the point-in-time copies at contiguous locations on the storage.

12. The system of claim 11, wherein the computer readable program code when executed further performs:
   performing for each of additional of the files the moving of the blocks for the file blocks in the point-in-time copies for the file to contiguous locations, wherein for each of the blocks for the file blocks for the file moved from the point-in-time copies are moved to a contiguous location on the storage to a list written block for the file.

13. The system of claim 11, wherein the moving the blocks for each of the point-in-time copies comprises only moving the blocks for the processed point-in-time copy that were not moved during previous instances of moving the blocks for the point-in-time copies for the file.

14. The system of claim 11, wherein the blocks for the file blocks are moved for the point-in-time copies having an active status before the blocks for the file blocks are moved for the point-in-time copies having an inactive status, wherein the inactive status is set for one of the point-in-time copies when the point-in-time copy is not accessed for a predetermined time.

15. The system of claim 11, wherein the file blocks for files in the point-in-time copies are defragmented serially, such that different versions of at least one of the blocks in different point-in-time copies are not at contiguous storage locations in the storage and blocks for the file blocks within each of the point-in-time copies are written contiguously.

16. The system of claim 11, wherein the moving the blocks for the file blocks comprises moving multiple blocks for one of the file blocks from different point-in-time copies to contiguous locations on the storage.

17. A method for defragmenting files in a file system in a storage, comprising:
   maintaining multiple point-in-time copies for a file having file blocks, wherein each point-in-time copy of the point-in-time copies to the file has at least one block in the storage that is a version for at least one of the file blocks in the file and wherein the each point-in-time copy of the point-in-time copies indicates a point-in-time copy location having versions of the file blocks for the file as of a point-in-time of the point-in-time copy that were subsequently modified;
   determining accesses to the point-in-time copies;
   determining an order of the point-in-time copies based on the determined accesses; and
   processing the point-in-time copies according to the determined order by performing, for each processed point-in-time copy, processed according to the determined order, for the file and for each file block of the file the processed point-in-time copy, moving a most recently modified block of the file block being considered in the processed point-in-time copy or in one of the point-in-time copy older than the processed point-in-time copy to a location on the storage contiguous to a last written block for another file block in the file that was moved from one of the point-in-time copies, wherein the moving moves different versions of the blocks for the file blocks for the file from the multiple point-in-time copies to store blocks for the file blocks for the file from different of the point-in-time copies at contiguous locations on the storage.

18. The method of claim 17, further comprising:
   performing, for each of additional of the files, the moving of the blocks for the file blocks in the point-in-time copies for the file to contiguous locations, wherein for each of the blocks for the file blocks for the file moved from the point-in-time copies are moved to a contiguous location on the storage to a list written block for the file.

19. The method of claim 17, wherein the moving the blocks for each of the point-in-time copies comprises only moving the blocks for the processed point-in-time copy that were not moved during previous instances of moving the blocks for the point-in-time copies for the file.

20. The method of claim 17, wherein the blocks for the file blocks are moved for the point-in-time copies having an active status before the blocks for the file blocks are moved for the point-in-time copies having an inactive status, wherein the inactive status is set for one of the point-in-time copies when the point-in-time copy is not accessed for a predetermined time.

21. The method of claim 17, wherein the file blocks for files in the point-in-time copies are defragmented serially, such that different versions of at least one of the blocks in different point-in-time copies are not at contiguous storage locations in the storage and blocks for the file blocks within each of the point-in-time copies are written contiguously.

22. The method of claim 17, wherein the moving the blocks for the file blocks comprises moving multiple blocks for one of the file blocks from different point-in-time copies to contiguous locations on the storage.

\* \* \* \* \*